2,893,999

2,4b-DIMETHYL-1-(2-HYDROXYETHYL) - 2 - METH-ALLYL DODECAHYDROPHENANTHRENE COMPOUNDS AND PROCESSES OF PREPARING THE SAME

Lewis H. Sarett, Princeton, N.J., and William F. Johns, Morton Grove, Ill., assignors to Merck & Co., Inc., Rahway, N.J., a corporation of New Jersey No Drawing. Application January 8, 1957
Serial No. 632,985

4 Claims. (Cl. 260—340.9)

This invention relates to cyclopentanopolyhydrophenanthrene compounds and processes of obtaining the same. More particularly, it is concerned with a novel process for converting polyhydrophenanthrene compounds to cyclopentanopolyhydrophenanthrene compounds. Specifically, it is concerned with the preparation of dl-11-keto progesterone and dl-11-hydroxy progesterone and novel polyhydrophenanthrene compounds useful in preparing the same.

This application is a continuation-in-part of our copending application Serial No. 310,134, filed September 17, 1952, now Patent 2,786,064.

The preparation of steroid substances by total synthesis involving the formation of the four ring system, the introduction of angular methyl groups at positions 10 and 13, and the placing of desired functional substituents in the ring system presents a formidable challenge. In addition to these difficulties, the problem is further complicated by the stereo-chemistry of steroidal substances. Thus, saturated steroids, with a minimum of six asymmetric centers, are capable of existing in at least sixty-four stereochemical modifications. However, in view of the therapeutic value and importance of steroids such as cortisone and the like, and the scarcity of raw materials suitable for use as starting materials in the preparation of cortisone and related compounds, efforts have been made to prepare these compounds by total synthesis.

It is an object of the present invention to provide a new method for converting polyhydrophenanthrene compounds to 1,2-cyclopentanopolyhydrophenanthrene compounds; thereby making possible the preparation of steroids by total synthesis.

Another object is to provide a novel process for the preparation of dl-11-keto progesterone and dl-11-hydroxy progesterone from functionally substituted dodecahydrophenanthrene compounds.

An additional object is to provide novel dodecahydrophenanthrene compounds which are useful as intermediates in the synthesis of dl-11-keto progesterone and dl-11-hydroxy progesterone.

Other objects will be apparent from the detailed description of our invention hereinafter provided.

In accordance with our invention, we have found that polyhydrophenanthrene compounds having in ring C a methallyl substituent at position 2 and a carboxymethyl or esterfied carboxymethyl substituent at position 1 can be treated to effect ring closure, thereby forming ring D of the steroid skeleton and providing a functional substituent at position 17. Our process for effecting this ring closure and the formation of a 20-keto pregnane compound can be shown by the partial formulas as follows:

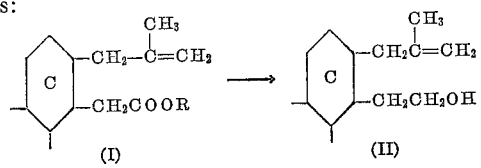

wherein R represents hydrogen, an alkyl radical, an aryl radical, or an aralkyl radical, and $R_1$ represents an alkyl radical, an aryl radical or an aralkyl radical.

In accordance with the foregoing flow sheet, the starting polyhydrophenanthrene compound having a methallyl substituent at C-2 and a carboxymethyl or esterified carboxymethyl substituent at C-1 (I) is reacted with an alkali or an alkaline earth metal or an alkali or alkaline earth metal aluminum hydride to form the corresponding primary alcohol (II). This latter compound is then treated with an organic sulfonyl halide in the presence of a tertiary amine to form the sulfonic acid ester (III). In the next step of our process, the sulfonic acid ester is oxidized to convert the 2-methallyl substituent into an acetonyl substituent and form Compound IV. Upon intimately contacting Compound IV with an alkali, ring closure is effected to form the 20-keto-steroid compound (V).

Alternatively, as will be apparent to those skilled in the art, the order of carrying out these reactions can be varied. Thus, the oxidation of the methallyl substituent to form the acetonyl compound can be effected prior to the formation of the sulfonate derivative if desired. However, we have found that the sequence of the reactions shown previously is most satisfactory.

The processes described above can be used to convert saturated or unsaturated polyhydrophenanthrene compounds having in ring C the substituents depicted above to the corresponding steroid compounds. In addition, the starting polyhydrophenanthrene compounds can also have other functional substituents such as keto groups or protected hydroxyl groups in rings A, B or C of the starting polyhydrophenanthrene compound. When this method is utilized in the preparation of a steroid having angular methyl groups at positions 10 and 13, polyhydrophenanthrenes having methyl substituents at positions 2 and 4b are employed as starting materials.

Thus, pursuant to a further embodiment of our invention, the above-described procedures may be utilized in the preparation of dl-11-keto progesterone from 2,4b-dimethyl - 1 - carboxymethyl - 2 - methallyl-7-ethylenedioxy - 1,2,3,4,4a,4b,5,6,7,8,10,10a - dodecahydrophenanthrene-4-ol, or the corresponding compound having an esterfied carboxymethyl substituent in place of the carboxymethyl group. These reactions may be shown as follows:
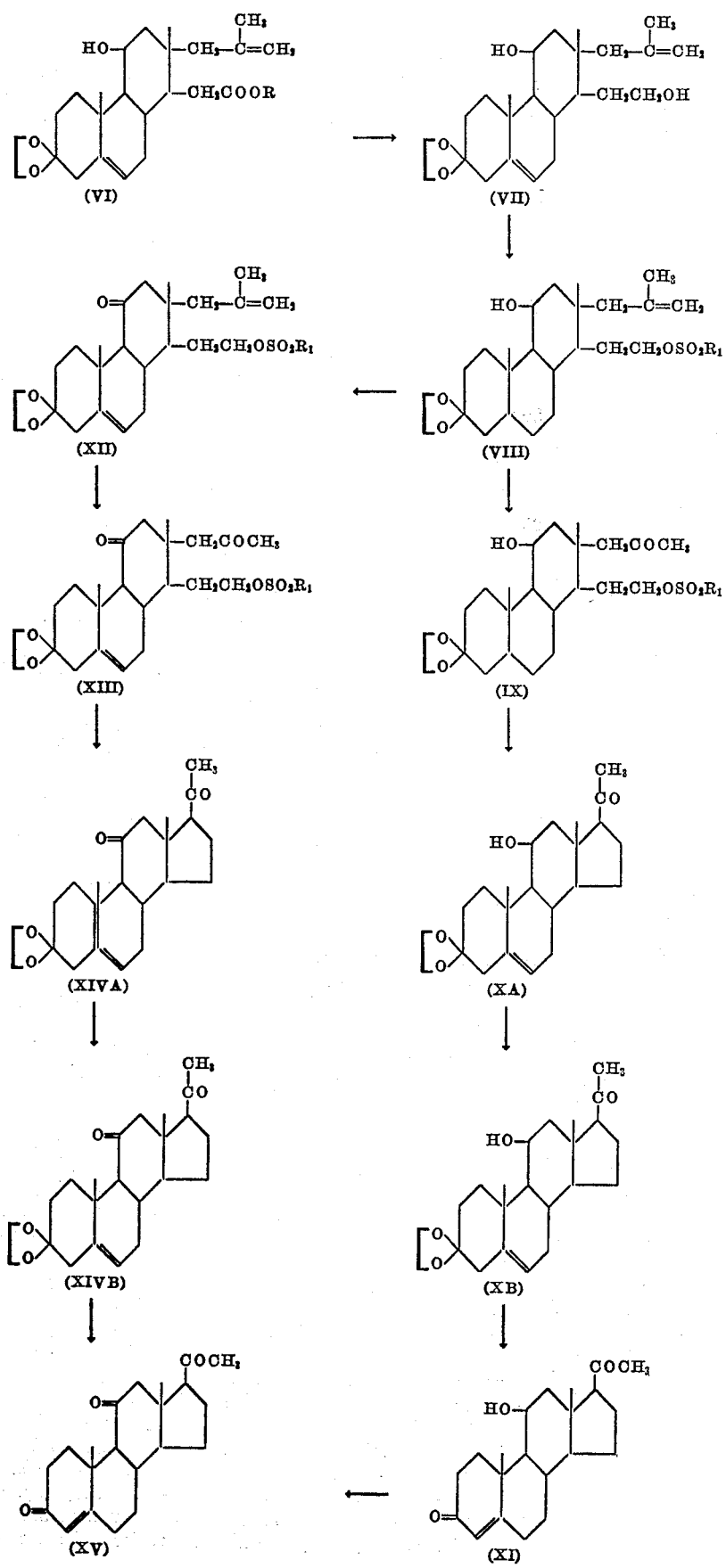

wherein R represents hydrogen, an alkyl radical, an aryl radical, or an aralkyl radical, and $R_1$ represents an alkyl, aryl, or aralkyl radical.

Thus, in accordance with the foregoing reaction scheme, the starting compound, 2,4b-dimethyl-1-(carboxymethyl)-2-methallyl - 7 - ethylenedioxy-1,2,3,4,4a,4b,5,6,7,8,10,10a-dodecahydrophenanthrene-4-ol, or the corresponding compound having an esterfied carboxymethyl substituent (VI), is first reduced to form the corresponding primary carbinol (VII). This reduction is readily effected by intimately contacting Compound VI with an alkali or an alkali metal aluminum hydride or the free metal in a suitable inert reaction medium (inter alia dioxane, tetrahydropyran, tetrahydrofuran, a lower alkanol and the like). For example, the reduction is conveniently carried out by reacting Compound VI with lithium aluminum hydride in tetrahydrofuran at room temperature for sufficient time to complete the reaction. The reduction can be effected in shorter time by heating the reactants at temperatures up to about 150° C. After the reduction with the lithium aluminum hydride is complete, the desired product is readily recovered by adding water to the reaction mixture, filtering, and evaporating the filtrate under diminished pressure.

As indicated above, dodecahydrophenanthrene compounds having either a 1-carboxymethyl substituent or an esterified carboxymethyl substituent can be reduced in accordance with our process to obtain the corresponding dodecahydrophenanthrene compound having at position 1 a 2-hydroxyethyl substituent. Lower alkyl esters such as carbomethoxymethyl, carboethoxymethyl, and carbopropoxymethyl which are readily-prepared are most conveniently reduced by our process.

In the second step of our process, the 1-(2-hydroxyethyl)-dodecahydrophenanthrene compound is converted to the corresponding sulfonic acid derivative (VIII) by reaction with an alkyl, aryl, or aralkyl sulfonyl halide in the presence of a tertiary amine. In carrying out this reaction we usually prefer to form the tosyl derivative by reacting 2,4b-dimethyl - 1 - (2-hydroxyethyl) - 2 - methallyl - 7 - ethylenedioxy-1,2,3,4,4a,4b,5,6,7,8,10,10a-dodecahydrophenanthrene-4-ol (VII) with para toluene sulfonyl chloride in the presence of pyridine since maximum yields of the tosyl derivative are usually obtained under optimum conditions. However, other sulfonyl halides such as a methane sulfonyl halide, a benzene sulfonyl halide, and the like can be used to obtain the corresponding sulfonic acid derivatives. Similarly, other tertiary amines such as picoline, trimethyl amine, and the like are suitable reaction mediums for this condensation. After the reaction is complete, the sulfonic acid ester is readily recovered by diluting the reaction mixture with water and extracting the product from the aqueous solution with a water immiscible solvent such as ether.

The hydroxyl substituent at C-4 of Compound VIII can, if desired, be oxidized at this point of the overall process to form the corresponding 11-keto compound (XII). We have found that this oxidation is readily effected by reacting Compound VIII with a chromic anhydride-pyridine complex in pyridine. The oxidized product is recovered by diluting the reaction mixture with water, extracting the aqueous solution with a water immiscible solvent, such as ether, and concentrating the solvent extract under diminished pressure. The residue so obtained can be further purified by chromatography over acid washed alumina.

In the next step of our process, the methallyl side chain at C-2 in Compounds VIII and XII is oxidized to convert this substituent to an acetonyl radical, thereby forming Compounds IX and XIII. This oxidation of the methallyl substituent can be effected in several ways. Thus, the oxidation can be carried out by reacting Compound VIII or Compound XII with osmium tetroxide and decomposing the osmate ester to form the corresponding glycol which in treatment with a glycol splitting agent such as periodic acid, lead tetraacetate, and the like yields the acetonyl compound. Alternatively, the preparation of the acetonyl substituted dodecahydrophenanthrene compound is effected by intimately contacting Compounds VIII and XII with ozone, and decomposing the resulting ozonide derivative with a suitable reducing agent to form Compounds IX and XIII, respectively.

Alternatively, as indicated above, Compound VII and the corresponding 4-keto compound can be oxidized to form the corresponding acetonyl compounds which can then be reacted with the sulfonyl halide to obtain Compounds IX and XIII, respectively.

The ring closure of Compounds IX and XIII to form ring D of the steroid compounds is brought about by intimately contacting these compounds with a base, such as triethylamine, an alkali metal, an alkali metal alkoxide, an alkali metal hydride, or an alkaline earth metal alkoxide (inter alia, sodium, potassium, sodium methoxide, potassium tertiary butoxide, sodium isopropoxide, sodium hydride, and the like). The reaction is conveniently carried out in a suitable solvent medium such as a lower alkanol, benzene, toluene, ether or the like. Generally, we prefer to effect this ring closure by reacting Compound IX or Compound XIII with a sodium or potassium alkoxide in a lower alkanol, since these reactants are readily available and their use results in good yields of the desired steroid compounds. Thus, the ring closure is conveniently effected by reacting Compounds IX or XIII with sodium methoxide in methanolic solution at room temperature for sufficient time to complete the reaction. The resulting steroid compound is recovered by diluting the resulting reaction mixture with water, extracting the desired product with a water immiscible solvent such as chloroform, and concentrating the resulting extract under diminished pressure. The product so obtained can be further purified, if desired, by chromatography over acid washed alumina.

In this reaction for effecting the ring closure and the formation of the desired steroid compound, the isopregnene compound (XA or XIVA) is apparently the initial product formed. These isopregnene compounds can be readily epimerized by further treatment with alkali to form the desired normal pregnane compounds. This change may be visualized as taking place as follows:

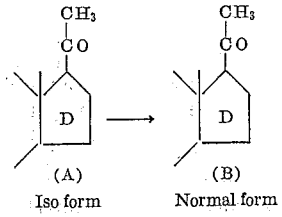

(A)　　　　(B)
Iso form　　Normal form

The pregnene Compounds XIVB and XB so obtained may be hydrolyzed by reaction with acid to cleave the protecting ethylenedioxy substituent and regenerate the 3-keto substituent, thereby forming Compounds XV (dl-11-keto progesterone) and XI (dl-11-hydroxy progesterone), respectively, in which the double bond is shifted to the 4,5 position. Alternatively, as will be readily apparent to those skilled in the art, the other intermediate products, namely, VII–XIVB, can be similarly hydrolyzed, for example, by reaction with hydrochloric acid, perchloric acid, p-toluene sulfonic acid and the like, to cleave the ethylenedioxy group and obtain the corresponding keto compound. Further, Compound XI (dl-11-hydroxy progesterone) can be converted by oxidation, for example, by treatment with chromic oxide-pyridine complex, to dl-11-keto progesterone (XV).

The novel compounds of the present invention are useful in the pharmaceutical field and serve as intermediates in the preperation of adrenal cortical hormones, such as 11-dehydrocorticosterone (Kendall's Compound A), cortisone, hydrocortisone, and the like. Thus, dl-11-keto progesterone and the derivatives thereof are useful as intermediates in the preparation of cortisone, and cortisone-like compounds. Similarly, dl-11-hydroxy progesterone and derivatives thereof can be utilized as intermediates in the preparation of cortisone, hydrocortisone, and other steroid compounds having cortisone-like activity.

In the foregoing reaction sequence specifically illustrating the processes of our invention, we have employed the ethylenedioxy derivatives, although other cyclic ketal derivatives can be similarly used in our process. In general, we have found the lower alkylenedioxy derivatives wherein the hydrocarbon group contains not more than seven carbon atoms such as the ethylenedioxy, trimethylenedioxy, propylenedioxy and butylenedioxy derivatives are most suitable in carrying out the processes of our invention. However, in place of using a lower alkylenedioxy substituent to block or protect the keto substituent, we can use other derivatives readily hydrolyzable to keto, such as an enol ether monothioketal, or a dithioketal derivative for this purpose.

The examples which follow are presented to illustrate methods of carrying out our process.

EXAMPLE 1

*2,4b-dimethyl-1-(2-hydroxyethyl)-2-methallyl - 7 - ethylenedioxy - 1,2,3,4,4a,4b,5,6,7,8,10,10a - dodecahydrophenanthrene-4-ol (VII)*

A solution of 2.58 g. of the stereoisomeric form of 2,4b-dimethyl - 1 - (1 - carbomethoxymethyl) - 2 - methallyl - 7 - ethylenedioxy - 1,2,3,4,4a,4b,5,6,7,8,10,10a-dodecahydrophenanthrene-4-ol, melting at 157–8° C., which may be prepared as described in copending application Serial No. 310,133, filed September 17, 1952, now abandoned, in 200 ml. absolute tetrahydrofuran was added to a solution of 0.80 mg. lithium aluminum hydride in 8 ml. tetrahydrofuran. The mixture was then stirred for 20 hours after which time the excess hydride was decomposed with water. The reaction mixture was then filtered, dried, and concentrated in vacuo to a crystalline residue of 2,4b-dimethyl-1-(2-hydroxyethyl)-2-methallyl-7-ethylenedioxy - 1,2,3,4,4a,4b,5,6,7,8,10,10a - dodecahydrophenanthrene-4-ol. The product was recrystallized from benzene and found to exist in two crystalline modifications, one melting at 200–1° C., and a second at 210–211° C.

A solution of 10 mg. of VII, M.P. 210–211° C. dissolved in 1 ml. of tetrahydrofuran and 0.5 ml. of 3 M perchloric acid solution was prepared and allowed to stand for 4 hours at room temperature. At the end of the 4 hour period the reaction mixture was neutralized with aqueous potassium bicarbonate solution. The product 2,4b-dimethyl-1-(2-hydroxyethyl)-2-methallyl-7-keto-1,2,3,4,4a,4b,5,6,7,9,10,10a - dodecahydrophenanthrene-4-ol, M.P. 153–155° C. is obtained by extraction with chloroform, evaporation of the chloroform extracts, and crystallization of the resulting residue from ethyl acetate.

EXAMPLE 2

*2,4b-dimethyl-1-(2-hydroxyethyl)-2-methallyl-7-ethylenedioxy-1,2,3,4,4a,4b,5,6,7,8,10,10a - dodecahydrophenanthrene-4-ol (VII)*

A solution of 2.54 g. of 2,4b-dimethyl-1-(1-carboxymethyl)-2-methallyl-7-ethylenedioxy - 1,2,3,4,4a,4b,5,6,7,8,10,10a-dodecahydrophenanthrene - 4 - ol, melting point 250–1° C., which may be prepared as described in copending application Serial No. 310,133, filed September 17, 1952, in 0.50 l. absolute tetrahydrofuran was added to a refluxing solution of 2.5 g. lithium aluminum hydride in 25 ml. tetrahydrofuran. The solution was stirred at reflux temperature for 30 minutes. At the end of this time the reaction mixture was quenched with water, and the product isolated as described in Example 1.

EXAMPLE 3

*2,4b-dimethyl-1-(2-tosyloxyethyl)-2-methallyl-7-ethylenedioxy-1,2,3,4,4a,4b,5,6,7,8,10,10a - dodecahydrophenanthrene-4-ol (VIII)*

To an anhydrous solution of 302 mg. of 2,4b-dimethyl-1-(2-hydroxyethyl)-2-methallyl - 7-ethylenedioxy-1,2,3,4,4a,4b,5,6,7,8,10,10a-dodecahydrophenanthrene - 4 - 4 - ol (VII) in pyridine was added 168 mg. of pure p-toluene sulfonyl chloride. The mixture was allowed to stand at room temperature for about 20 hours after which time the excess tosyl chloride was decomposed with a few drops of aqueous sodium bicarbonate. The solution was then diluted with water and extracted with ether. The organic extract was concentrated to dryness in vacuo. Pure 2,4b-dimethyl-1-(2-tosyloxyethyl) - 2 - methallyl - 7-ethylenedioxy - 1,2,3,4,4a,4b,5,6,7,8,10,10a - dodecahydrophenanthrene-4-ol (VIII), M.P. 157–8° C., was obtained from the crystalline residue by fractional crystallization from a mixture of benzene and petroleum ether.

In another experiment starting with 2.47 g. of Compound VII and 1.48 g. of p-toluene sulfonyl chloride, the reaction was successfully run with the temperature of the reaction mixture held at 0° C. for about 20 hours.

Upon hydrolysis of Compound VIII with acid the ethylenedioxy group is cleaved to obtain 2,4b-dimethyl-1-(2-tosyloxyethyl)-2-methallyl-7-keto-1,2,3,4,4a,4b,5,6,7,9,10,10a-dodecahydrophenanthrene-4-ol.

EXAMPLE 4

*2,4b-dimethyl-1-(2-tosyloxyethyl)-2-methallyl-7-ethylenedioxy-1,2,3,4,4a,4b,5,6,7,8,10,10a - dodecahydrophenanthrene-4-one (XII)*

160 mg. of 2,4b-dimethyl-1-(2-tosyloxyethyl)-2-methallyl-7-ethylenedioxy-1,2,3,4,4a,4b,5,6,7,8,10,10a - dodecahydrophenanthrene-4-ol in 1 ml. of anhydrous pyridine was added to a solution of 160 mg. chromic anhydride in 1 ml. pyridine. The mixture was allowed to stand at room temperature for 16 hours after which time it was diluted with water and extracted with ether. The ether extract was washed with water, dried, and concentrated to dryness in vacuo. A solution of the crystalline residue in a mixture of benzene and petroleum ether was chromatographed over acid washed alumina. Elution with ether yielded pure 2,4b-dimethyl-1-(2-tosyloxyethyl)-2-methallyl - 7 - ethylenedioxy - 1,2,3,4,4a,4b,5,6,7,8,10,10a-dodecahydrophenanthrene-4-one, (XII), M.P. 156–8° C.

Upon hydrolyzing compound XII with an acid such as perchloric acid, the ethylenedioxy substituent is cleaved to obtain 2,4b-dimethyl-1-(2-tosyloxyethyl)-2-methallyl-7 - keto-1,2,3,4,4a,4b,5,6,7,9,10,10a - dodecahydrophenanthrene-4-one.

EXAMPLE 5

*2,4b-dimethyl-1-(2-tosyloxyethyl)-2-acetonyl-7 - ethylenedioxy-1,2,3,4,4a,4b,5,6,7,8,10,10a - dodecahydrophenanthrene-4-one (XIII)*

To 445 mg. 2,4b-dimethyl-1-(2-tosyloxyethyl)-2-methallyl-7-ethylenedioxy-1,2,3,4,4a,4b,5,6,7,8,10,10a - dodecahydrophenanthrene-4-one dissolved in 5 ml. benzene was added 208 mg. osmium tetroxide. The solution was allowed to stand at room temperature for one hour. Seven ml. of ethyl alcohol and a solution of 0.7 g. sodium sulfite in 4 ml. water were then added and the solution shaken for twenty minutes. The upper organic layer was then decanted and filtered, while the lower layer was washed with ethyl alcohol. The alcohol was also filtered and combined with the upper organic layer. The benzene-alcohol solution containing the desired product was then concentrated in vacuo to one-tenth the original volume. The concentrate was diluted with water and extracted with chloroform. The chloroform extract, after being washed and dried, was concentrated to dryness in vacuo to give 2,4b-dimethyl-1-(2-tosyloxyethyl)-2-(2,3-dihydroxy-2-methyl)propyl-7-ethylenedioxy - 1,2,3,4,4a,4b,5,6, 7,8,10,10a-dodecahydrophenanthrene-4-one as an amorphous solid.

This material was dissolved in 4 ml. methyl alcohol and 1 ml. pyridine, and to this solution was added 250 mg. of periodic acid in 0.5 ml. water. The mixture was allowed to stand at room temperature for 30 minutes, diluted with water and extracted with chloroform. The organic extract was washed, dried, and concentrated in vacuo to an oil. Chromatography over acid washed alumina and elution with ether, yielded the desired product, 2,4b-dimethyl-1-(2-tosyloxyethyl)-2-acetonyl-7-ethylenedioxy-1,2,3,4,4a,4b,5,6,7,8,10,10a-dodecahydrophenanthrene-4-one (XIII), M.P. 104–8° C. (d.).

The above osmylation reaction was also successfully carried out in a 9:1 benzene-tetrahydrofuran solution utilizing 7.84 g. of Compound XII and 4.8 g. osmium tetroxide.

When compound XIII is subjected to acid hydrolysis, for example, by treatment with perchloric acid, the ethylenedioxy substituent is cleaved and 2,4b-dimethyl-1-(2-tosyloxyethyl)-2-acetonyl-7-keto - 1,2,3,4,4a,4b,5,6,7,9,10, 10a-dodecahydrophenanthrene-4-one is obtained.

EXAMPLE 6

$\Delta^5$-3-ethylenedioxy-11,20-diketo-17 - isopregnene (XIVA)

To a solution of 80 mg. of 2,4b-dimethyl-1-(2-tosyloxyethyl)-2-acetonyl-7-ethylenedioxy - 1,2,3,4,4a,4b,5,6,7, 8,10,10a-dodecahydrophenanthrene-4-one in 1 ml. methyl alcohol was added 0.08 ml. of a 2 N solution of sodium methoxide in methyl alcohol. The solution was allowed to stand in a closed flask at room temperature for one hour after which time it was diluted with water and extracted with chloroform. The chloroform extract was washed, dried, and concentrated in vacuo. The crystalline residue so obtained was chromatographed on alumina. Elution with a mixture of ether-petroleum ether yielded $\Delta^5$-3-ethylenedioxy-11,20-diketo-17-isopregnene (XIVA), M.P. 212–5° C., which on hydrolysis with acid yields $\Delta^5$-3,11,20-triketo-17-isopregnene.

EXAMPLE 7

$\Delta^5$-3-ethylenedioxy-11,20-diketo-17-isopregnene (XIVA)

To a solution of 80 mg. of 2,4b-dimethyl-1-(2-tosyloxyethyl) - 2 - acetonyl - 7 - ethylenedioxy - 1,2,3,4,4a,4b, 5,6,7,8,10,10a-dodecahydrophenanthrene-4-one in 1.5 ml. of benzene was added 0.15 ml. of a 1 M solution of potassium tertiary butoxide in tertiary butyl alcohol. This mixture was then stirred for 20 hours at room temperature. It was then diluted with water and extracted with chloroform. The chloroform extract was washed, dried, and concentrated under reduced pressure to produce a crystalline residue. The crystalline material was dissolved in a mixture of benzene and petroleum ether, chromatographed on acid washed alumina. From the ether-petroleum ether eluate was obtained crystalline $\Delta^5$-3-ethylenedioxy-11,20-diketo-17-isopregnene (XIVA).

EXAMPLE 8

$\Delta^5$-3-ethylenedioxy-11,20-diketo-pregnene (XIVB)

A solution of 165 mg. $\Delta^5$-3-ethylenedioxy-11,20-diketo-17-isopregnene in 5 ml. benzene and 2 ml. methyl alcohol was treated with 3 ml. 2 N methanolic sodium methoxide. The solution was allowed to stand at room temperature for 2 hours. It was diluted then with water, and extracted with chloroform. The chloroform extract was washed, dried, and concentrated in vacuo, giving a crystalline residue which yielded, after chromatography in the manner previously described, $\Delta^5$-3-ethylenedioxy-11,20-diketo-pregnene (XIVB), M.P. 181.0–182.5° C.

The above epimerization was also carried out using potassium carbonate in place of sodium methoxide.

When $\Delta^5$-3-ethylenedioxy-11,20-diketo-pregnene is subjected to acid hydrolysis by treatment with an acid such as perchloric acid, the ethylenedioxy substituent is cleaved and dl-11-keto progesterone (XV) ($\Delta^4$-3,11,20-triketo pregnane), is obtained.

EXAMPLE 9

2,4 - dimethyl - 1 - (2 - tosyloxyethyl) - 2 - acetonyl-7 - ethylenedioxy - 1,2,3,4,4a,4b,5,6,7,8,10,10a - dodecahydrophenanthrene-4-ol (IX)

To 910 mg. of 2,4b-dimethyl-1-(2-tosyloxyethyl)-2-methallyl -7- ethylenedioxy - 1,2,3,4,4a,4b,5,6,7,8,10,10a-dodecahydrophenanthrene-4-ol dissolved in 9 ml. of benzene and 2 ml. of tetrahydrofuran was added 545 mg. osmium tetraoxide. The solution was allowed to stand at room temperature for 30 minutes after which time 12 ml. of ethanol and a solution of 1.2 g. sodium sulfite in 7 ml. of water were added. The solution was then shaken for 25 minutes and the product, 2,4b-dimethyl-1 - (2 - tosyloxyethyl) - 2 - (2,3 -dihydroxy - 2 - methyl)-propyl - 7 - ethylenedioxy - 1,2,3,4,4a,4b,5,6,7,8,10,10a-dodecahydrophenanthrene-4-ol recovered in the same manner as described in Example 5 for the corresponding 4-keto compound.

0.84 gram of 2,4b-dimethyl - 1 - (2 - tosyloxyethyl)-2-(2,3 - dihydroxy - 2 - methyl) - propyl - 7 - ethylenedioxy-1,2,3,4,4a,4b,5,6,7,8,10,10a - dodecahydrophenanthrene-4-ol, dissolved in 8 ml. methanol and 2.2 ml. pyridine, was mixed with a solution of .61 g. periodic acid in 1.5 ml. of water. The mixture was allowed to stand at room temperature for 30 minutes, water added and the mixture extracted with chloroform. On removal of the chloroform there was obtained a residue containing 2,4b-dimethyl - 1 - (2 - tosyloxyethyl) - 2 - acetonyl - 7 -ethylenedioxy - 1,2,3,4,4a,4b,5,6,7,8,10,10a - dodecahydrophenanthrene-4-ol.

EXAMPLE 10

$\Delta^5$ - 3 - ethylenedioxy - 11 - hydroxy - 20 - keto pregnene and $\Delta^5$ - 3 - ethylenedioxy - 11 - hydroxy - 20 - keto-isopregnene A solution of 760 mg. of 2,4b-dimethyl-1-(2-tosyloxyethyl) - 2 - acetonyl - 7 - ethylenedioxy - 1,2,3,4,4a,4b, 5,6,7,8,10,10a-dodecahydrophenanthrene-4-ol in 5 ml. of methanol and .80 ml. of a solution of 2 N sodium methoxide in methanol was allowed to stand for 20 hours at room temperature. The resulting mixture was diluted with water, extracted with chloroform and the chloroform solution dried. After removal of the chloroform by distillation under reduced pressure, there was obtained a mixture of $\Delta^5$-3-ethylenedioxy-11-hydroxy-20-keto pregnene (XA) and $\Delta^5$-3-ethylenedioxy-11-hydroxy-20-keto-isopregnene (XB), M.P. 182–93° C.

The mixture of $\Delta^5$-3-ethylenedioxy-11-hydroxy-20-keto pregnene (XA) and $\Delta^5$-3-ethylenedioxy-11-hydroxy-20-keto-isopregnene (XB) of M.P. 182–193° C., was dissolved in acetone, a small amount of p-toluene sulfonic acid added and the solution heated at reflux temperature for 20 minutes. The product was recovered by adding water to the reaction mixture, extracting with chloroform, washing the chloroform extract with water, drying the extract and evaporating to dryness. The resulting solid was crystallized from ethyl acetate to give a crystalline product, M.P. 190–200° C. which is a mixture of $\Delta^4$-3,20-diketo-11-hydroxy-pregnene (XI), (dl-11-hydroxy progesterone), and $\Delta^4$-3,20-diketo-11-hydroxy-isopregnene.

Various changes and modifications may be made in carrying out the present invention without departing from the spirit and scope thereof. Insofar as these changes and modifications are within the purview of the annexed claims, they are to be considered as part of our invention.

What is claimed is:

1. 2,4b - dimethyl - 1 - (2 - hydroxyethyl) - 2 - methallyl - 7 - ethylenedioxy - 1,2,3,4,4a,4b,5,6,7,8,10,10a - dodecahydrophenanthrene-4-ol.

2. 2,4b - dimethyl - 1 - (2 - hydroxyethyl) - 2 - methallyl - 7 - keto - 1,2,3,4,4a,4b,5,6,7,9,10,10a - dodecahydrophenanthrene-4-ol.

3. 2,4b - dimethyl - 1 - (2 - hydroxyethyl) - 2 - methallyl - 7 - keto - 1,2,3,4,4a,4b,5,6,7,9,10,10a - dodecahydrophenanthrene-4-one.

4. A dodecahydrophenanthrene compound from the group consisting of a compound of the formula:

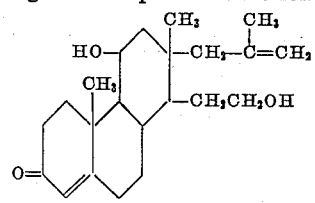

and the 7-lower alkylenedioxy ketals thereof.

References Cited in the file of this patent

Sarett et al.: J.A.C.S., vol. 74, pp. 4974–76 (1952).